ced by examiner

(12) United States Patent
Yu et al.

(10) Patent No.: US 8,162,280 B2
(45) Date of Patent: Apr. 24, 2012

(54) ADJUSTABLE JOINT

(75) Inventors: Hai-Yang Yu, Shenzhen (CN);
Hong-Wei Zhu, Shenzhen (CN);
Er-Zheng Zhao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 398 days.

(21) Appl. No.: 12/477,903

(22) Filed: Jun. 3, 2009

(65) Prior Publication Data
US 2010/0163700 A1 Jul. 1, 2010

(30) Foreign Application Priority Data
Dec. 30, 2008 (CN) .................. 2008 1 0 0306673

(51) Int. Cl.
*F16B 7/10* (2006.01)

(52) U.S. Cl. ............. 248/354.7; 248/354.1; 248/292.12; 403/109.1

(58) Field of Classification Search .................. 248/154, 248/924, 917, 918, 274.1, 279.1, 310, 313, 248/354.7, 354.1, 292.12, 354.6, 298.1, 285.1, 286.1; 403/109.1, 109.8; 74/533, 527–528, 535–538; 361/807, 810, 825, FOR. 104–FOR. 106

See application file for complete search history.

(56) References Cited

U.S. PATENT DOCUMENTS

| 5,813,647 | A * | 9/1998 | Chen ............................ 248/354.7 |
| 6,247,882 | B1 * | 6/2001 | Huang ............................ 410/151 |
| 6,837,642 | B1 * | 1/2005 | Lin ............................ 403/109.1 |

* cited by examiner

*Primary Examiner* — Terrell McKinnon
*Assistant Examiner* — Ingrid M Weinhold
(74) *Attorney, Agent, or Firm* — Altis Law Group, Inc.

(57) ABSTRACT

An adjustable joint for a flat object is disclosed. The adjustable joint includes an extending portion connected to the flat object, a fixed portion, and a resilient portion connected to the extending portion and the fixed portion. The resilient portion includes a joint member connecting the extending portion and the fixed portion, a latching member received in the joint member and latching the extending portion, an operating lever rotatably connected to the joint member and configured for adjusting the tightness of the extending portion and, a connecting member connecting the latching member and the operating lever, wherein when the operating lever is rotated, the connecting member drives the latching member to grasp or release the extending portion.

14 Claims, 5 Drawing Sheets

ADJUSTABLE JOINT

BACKGROUND

1. Technical Field

The present disclosure relates to adjustable joints.

2. Description of Related Art

For positioning a flat object, such as liquid crystal displays, plasma displays, etc., a supporting structure is usually attached on the back of a flat object. The supporting structure includes a mounting bracket and a number of connecting bars. The mounting bracket can be placed on a table or mounted on a wall. One end of each connecting bars is connected to the mounting bracket, the other end of each connecting bar is connected to the edge of the flat object. For conveniently adjusting the flat object, each of the connecting bars includes an adjustable joint thereon. The adjustable joint is configured for adjusting the distance between the connecting bar and the flat object. However, the user or adjuster must make a judgment on the ultimate tightening force to apply. Thus, if the tightening force is greater than the maximum force that the flat object is capable of, the flat object may be damaged.

What is needed, therefore, is an adjustable joint to overcome the above-mentioned problems.

DETAILED DESCRIPTION

Figure 1:
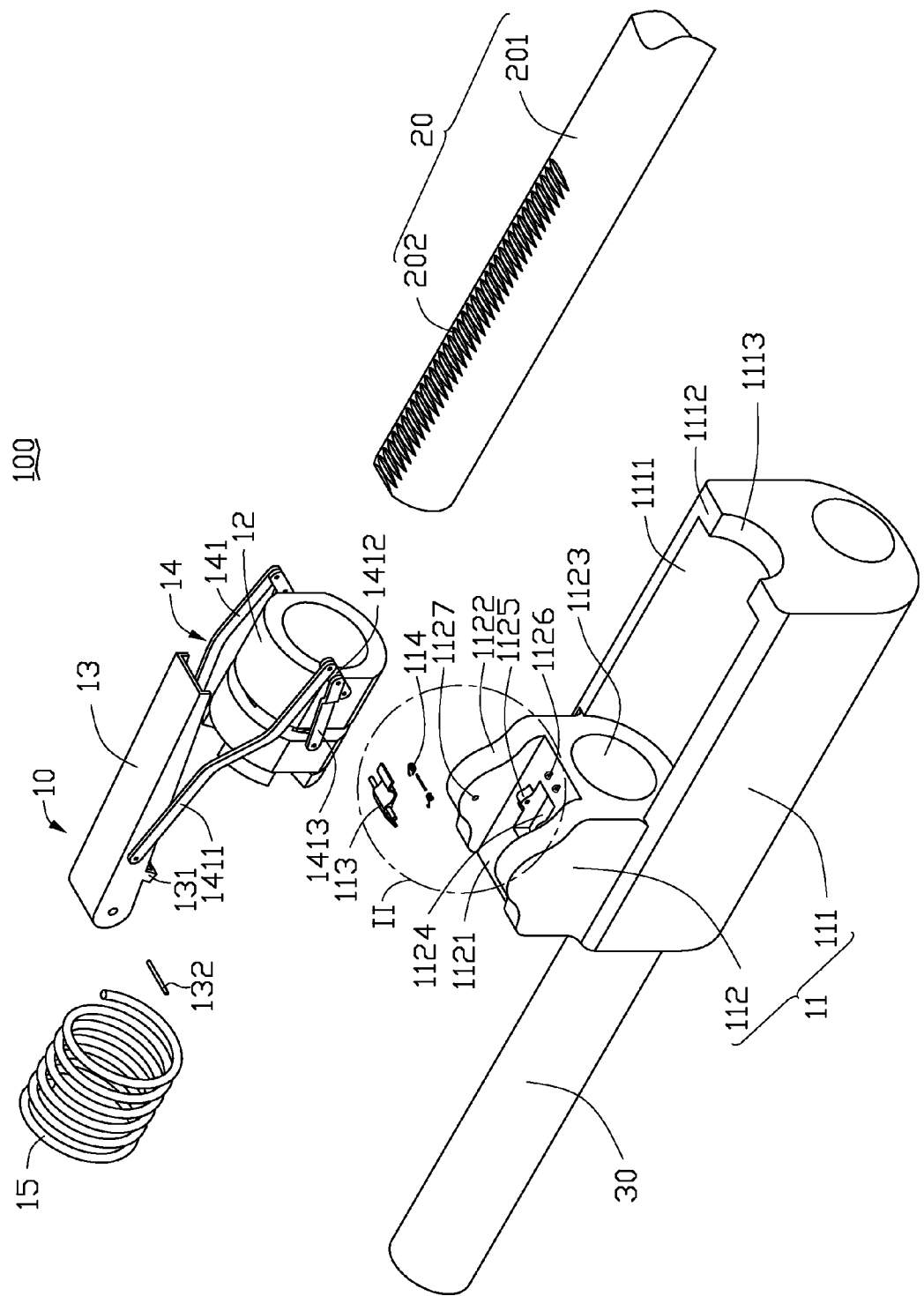
FIG. 1 is an isometric, exploded view of an adjustable joint, according to an exemplary embodiment.

Referring to FIG. 1, an adjustable joint 100, according to an exemplary embodiment, is shown. The adjustable joint 100 includes a resilient portion 10, an extending portion 20, and a fixed portion 30.

The extending portion 20 includes a cylindrical portion 201 connected to a flat object (not shown) and a rack portion 202 on one end opposite to the flat object. The rack portion 202 includes a number of teeth on the cylindrical surface of the extending portion 20.

The resilient portion 10 includes a joint member 11, a latching member 12, an operating lever 13, and a connecting member 14.

The joint member 11 connects the fixed portion 30 and the extending portion 20. The joint member 11 includes a receiving portion 111 and a fulcrum portion 112. The fulcrum portion 112 is integrally formed on one end of the receiving portion 111.

The receiving portion 111 defines a groove 1111 for receiving the latching member 12. One end of the groove 1111 forms a resisting wall 1112. The resisting wall 1112 is configured for limiting the movement of the latching member 12. The resisting wall 1112 defines a curved recess 1113.

The fulcrum portion 112 supports the operating lever 13 and configured for adjusting the position of the extending portion 20 relative to the receiving portion 111. The fulcrum portion 112 includes a top surface 1121 and two first supporting walls 1122 extending from two sides of the top surface 1121 and parallel to each other. The fulcrum portion 112 defines a through hole 1123. The top surface 1121 defines an opening 1124. The opening 1124 communicates with the through hole 1123. Two second supporting walls 1125 are formed on the top surface 1121 and positioned at opposite sides of the opening 1124. The second supporting walls 1125 are parallel to the first supporting walls 1122 respectively. Two third supporting walls 1126 are formed on the top surface 1121 and positioned near a side of the opening 1124 and near the extending portion 20.

Figure 2:
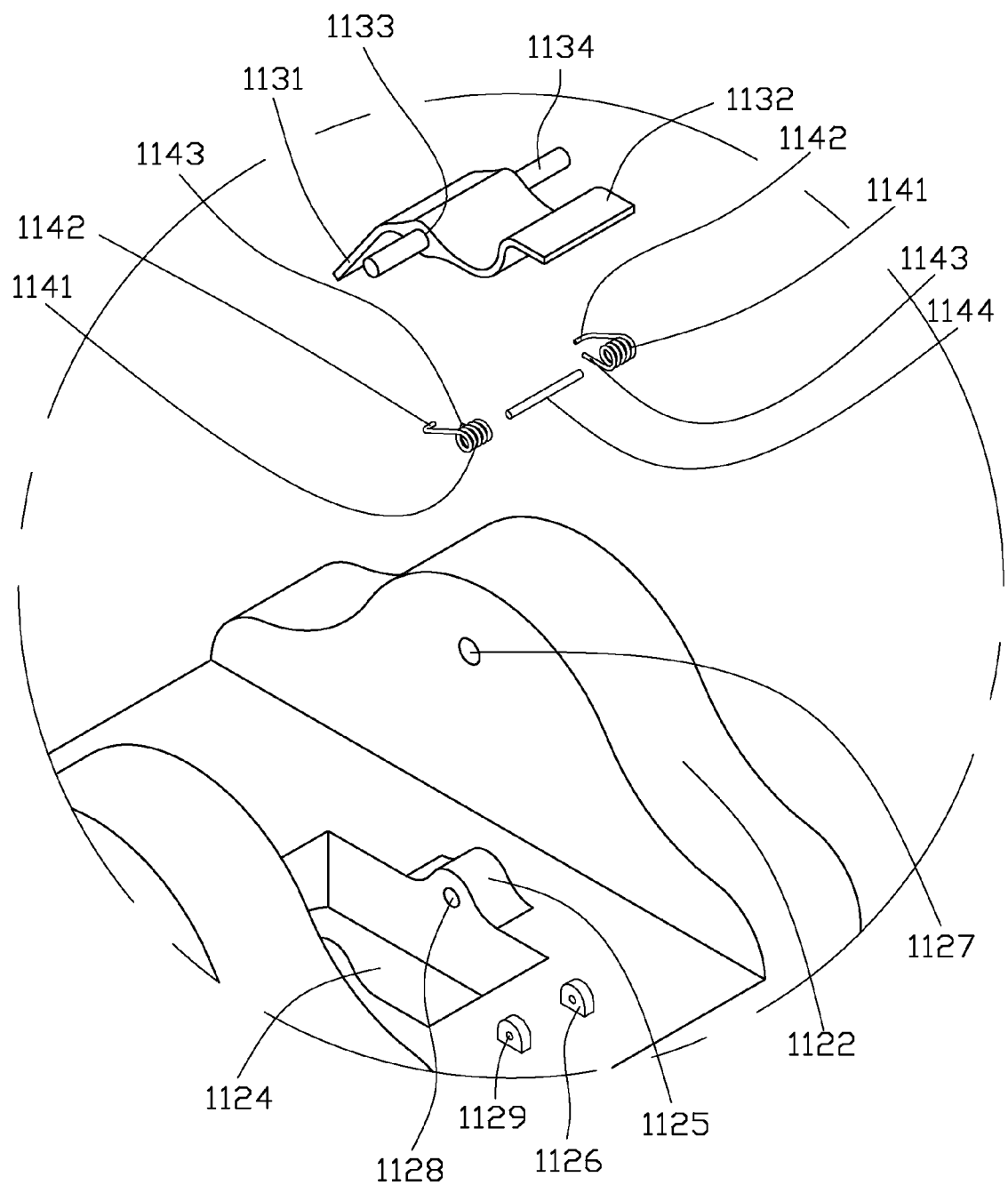
FIG. 2 is an enlarged view of portion II of FIG. 1.

Referring to FIG. 2, the first supporting walls 1122 define two first pivot holes 1127 in opposite sides thereof. The second supporting walls 1125 define two second pivot holes 1128 in opposite sides thereof. The third supporting walls 1126 define two third pivot holes 1129 in opposite sides thereof.

Referring to FIG. 1 and FIG. 2, the joint member 11 further includes a latching unit 113. The latching unit 113 includes a latching end 1131 and a driven end 1132 opposite to the latching end 1131. The latching unit 113 defines a fourth pivot hole 1133 in the middle position between the latching end 1131 and the driven end 1132. A second shaft 1134 passes through the fourth pivot hole 1133 and is fixed in the second pivot holes 1128. Thereby, the latching unit 113 is pivotably connected to the fulcrum portion 112 above the opening 1124 with the latching end 1131 extending into the opening 1124.

The joint member 11 further includes a resilient unit 114 driving the driven end 1132 of the latching unit 113. The resilient unit 114 includes two torsion springs positioned side by side, each of the torsion springs includes a helix portion 1141 and two resilient ends 1142, 1143 extending from two ends of the helix portion 1141 correspondingly. The springs are sleeved on a pivot shaft 1144 and ends of the pivot shaft 1144 are inserted into the third pivot holes 1129. The resilient ends 1142 resist the driven end 1132 and the resilient ends 1143 resist the latching unit 113 while the springs are resisting the inner sides of the third supporting walls 1126.

Figure 3:
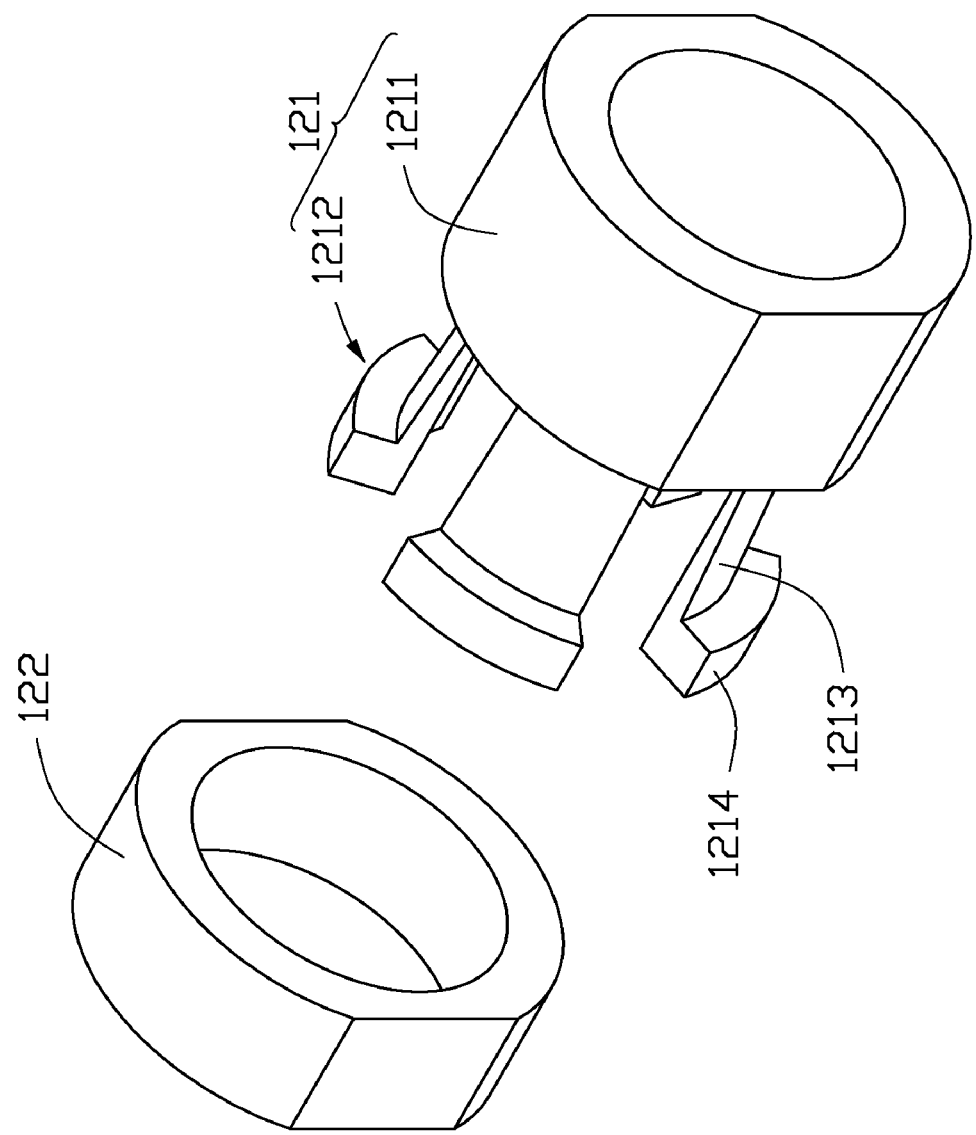
FIG. 3 is an isometric, exploded view of a latching member of the adjustable joint of FIG. 1.

Referring to FIG. 1 and FIG. 3, the latching member 12 is received in the groove 1111 and grasps the extending portion 20. The latching member 12 includes a grasp member 121 and a fastening ring 122 sleeved on the grasp member 121. The grasp member 121 includes a sleeve portion 1211 and a gripping portion 1212 connecting to the sleeve portion 1211. The gripping portion 1212 includes a number of independent claws 1213. Each claw 1213 of the gripping portion 1212 is resilient, and the fastening ring 122 is sleeved on the claws 1213. The thickness of each claw 1213 gradually increases from the sleeve portion 1211 to a distal end thereof. The gripping portion 1212 further includes a limiting block 1214 integrally formed outward on the distal end of each claw 1213 for preventing the fastening ring 122 from disengaging from the gripping portion 1212.

Referring to FIG. 1 and FIG. 2, the operating lever 13 is configured for adjusting the tightness of the extending portion 20. One end of the operating lever 13 forms a stay 131 thereon.

The connecting member 14 is configured for connecting the latching member 12 on the operating lever 13. The connecting member 14 includes two link lever portions 141. Each link lever portion 141 includes a first link lever 1411, a second link lever 1412 and a third link lever 1413. The first link levers 1411, the second link levers 1412, and the third link levers 1413 are correspondingly rotatably connected to each other in sequence. One end of the first link lever 1411 is rotatably connected to one end of the operating lever 13 near the stay 131, the other end of the first link lever 1411 is rotatably connected to one end of the second link lever 1412. The other end of the second link lever 1412 is rotatably connected to the sleeve portion 1211 of the grasp member 121. One end of the third link lever 1413 is rotatably connected to the middle position of the second link lever 1412 and the other end of the third link lever 1413 is rotatably connected to the fastening ring 122, such that the operating lever 13 is rotatably connected to the latching member 12.

The resilient portion 10 further includes a spring 15 received in the groove 1111 of the receiving portion 111 near the fulcrum portion 112, such that the latching member 12 is resisted between the spring 15 and the resisting wall 1112 of the receiving portion 111 and configured for restoring the latching member 12 to an original position.

In assembly, the end of the extending portion 20 with the rack portion 202 is inserted through the latching member 12 and received in the through hole 1123 of the fulcrum portion 112 with the rack portion 202 facing the opening 1124, such that the latching end 1131 of the latching unit 113 resists the rack portion 202 of the extending portion 20. The spring 15 is received in the groove 1111 via the curved recess 1113 of the resisting wall 1112 and is sandwiched between the fulcrum portion 112 and the latching member 12.

The operating lever 13 is rotatably connected to the first supporting walls 1122 of the fulcrum portion 112 by passing a first pivot shaft 132 through the end of the operating lever 13 near the stay 131 and fixed in the first pivot holes 1127, such that the stay 131 of the operating lever 13 is positioned above the driven end 1132 of the latching unit 113.

Figure 4:
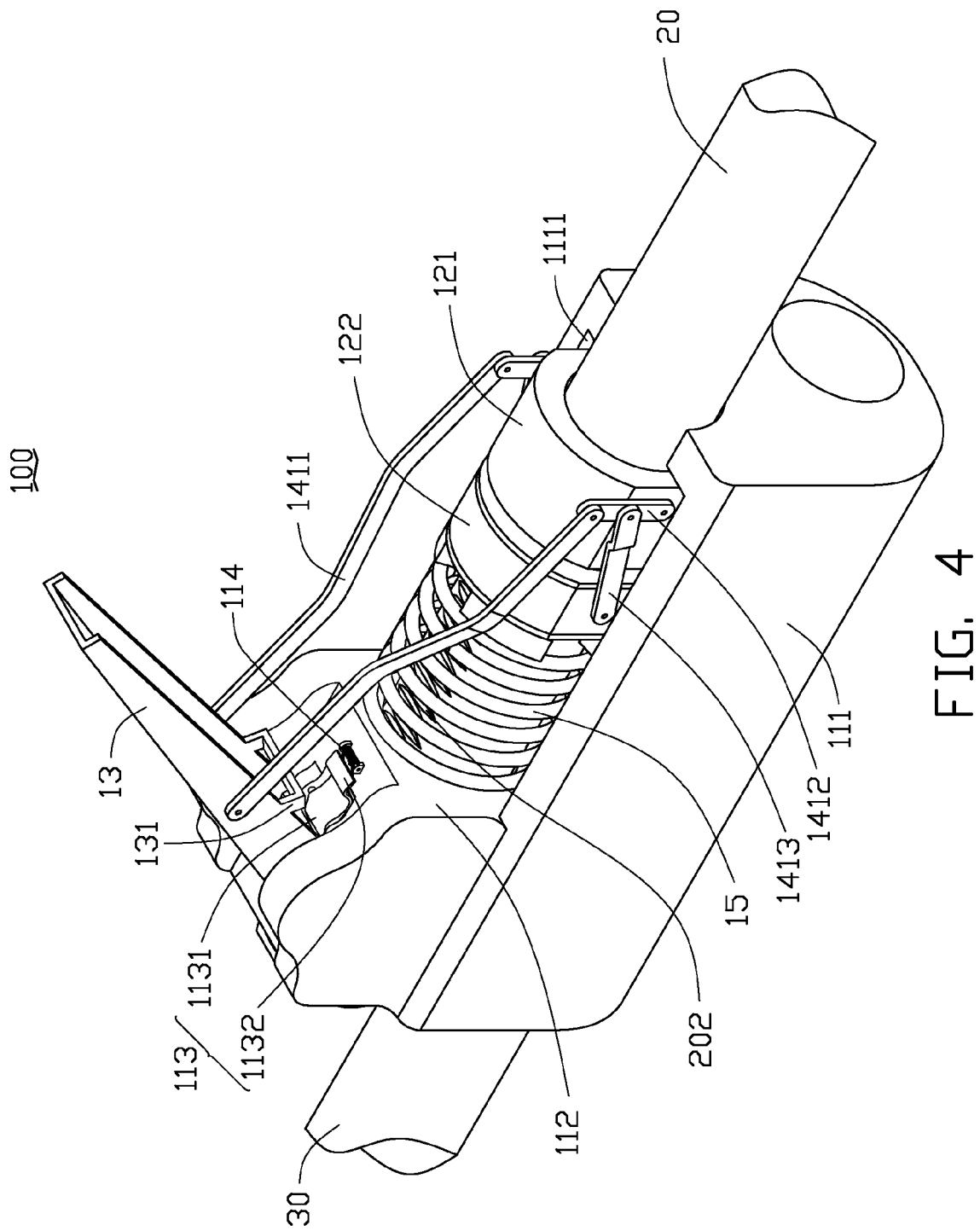
FIG. 4 is an isometric, assembled view of the adjustable joint of FIG. 1, which is in a first state.
Figure 5:
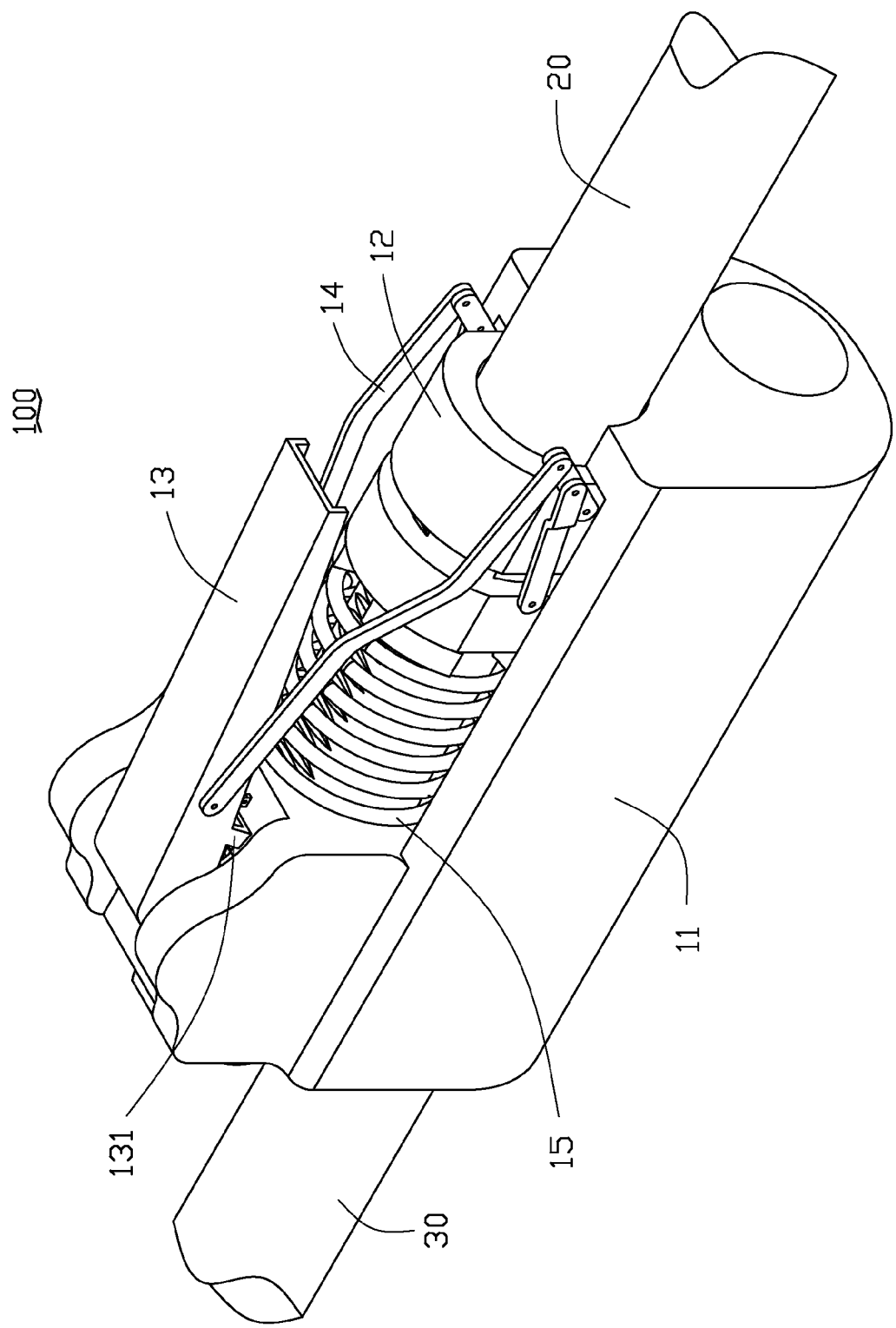
FIG. 5 is an isometric, assembled view of the adjustable joint of FIG. 1, which is in a second state.

Referring to FIG. 4 and FIG. 5, the assembled views of the adjustable joint 100 in two different states are shown. If the extending portion 20 does not need to be adjusted, the rack portion 202 of the extending portion 20 is resisted by the latching end 1131 of the latching unit 113. If the extending portion 20 needs to be adjusted, the operating lever 13 is rotated around the first pivot shaft 132 (see FIG. 1) away from the latching member 12. When the operating lever 13 is rotated, the second link lever 1412 is driven to rotate about the grasp member 121 by the first link lever 1411, the third link lever 1413 is driven by the second link lever 1412 to drive the fastening ring 122 to slide along the gripping portion 1212 of the latching member 12 away from or toward the sleeve portion 1211 of the grasp member 121. The gripping portion 1212 can tightly grasps the extending portion 20 when the fastening ring 122 slides, thus the extending portion 20 is pulled into the through hole 1123 of the fulcrum portion 112 by the latching member 12.

When the operating lever 13 is rotated to the largest angle, the latching end 1131 of the latching unit 113 moves down and engages with the rack portion 202 of the extending portion 20 due to the elastic force of the resilient unit 114, therefore, the engagement of the latching end 1131 on the rack portion 202 prevents the extending portion 20 from sliding away from the fixed portion 30. The extending portion 20 can be continually adjusted into the through hole 1123 to shorten the extending length of the arms 20 by pulling the operating lever 13 along a direction away from the latching member 12 repeatedly.

The latching member 12 can be driven back to the original position under the resilient force of the spring 15 or by pushing the operating lever 13 towards the fulcrum portion 112. When the operating lever 13 moves from the largest angle to the original angle, the fastening ring 122 is pulled towards the sleeve portion 1211 of the grasp member 121 along the gripping portion 1212. Then the extending portion 20 is loosened from the grasp member 121 to adjust the length of the arms 20.

When the tightening force between the extending portion 20 and the fixed portion 30 has reached the maximal static friction force between the grasp member 121 and the extending portion 20, the length of the arms 20 cannot be shortened any more. The value of the maximal static friction force can be a designed choice and is no more than the largest value of the tightening force the flat object can endure. With such a structure, the resilient portion 10 can protect the flat object from damages.

If the extending portion 20 needs to be lengthened, the end of the operating lever 13 is pressed down towards the joint member 11. When pressing down the operating lever 13, the driven end 1132 of the latching unit 113 is also pressed by the stay 131 down to the top surface 1121 of the fulcrum portion 112, through the opening 1124, to release the latching end 1131 thereof from the rack portion 202. Thus, the extending portion 20 can be extended out of the through hole 1123.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An adjustable joint for a flat object, comprising:
   an extending portion connected to the flat object;
   a fixed portion; and
   a resilient portion, comprising:
   a joint member connecting the extending portion and the fixed portion;
   a latching member received in the joint member and latching the extending portion, comprising:
   a grasp member sleeved on the extending portion configured for grasping the extending portion, and
   a fastening ring movably sleeved on the grasp member and capable of driving the grasp member to grasp or release the extending portion;
   an operating lever rotatably connected to the joint member and configured for adjusting the tightness of the extending portion; and
   a connecting member connecting the latching member and the operating lever, wherein when the operating lever is rotated, the connecting member drives the latching member to grasp or release the extending portion.

2. The adjustable joint as claimed in claim 1, wherein the extending portion comprises a cylindrical portion and a rack portion on one end opposite to the flat object, the rack portion comprising a plurality of teeth on the cylindrical surface of the extending portion.

3. The adjustable joint as claimed in claim 1, wherein the grasp member comprises a sleeve portion and a gripping portion connected to the sleeve portion.

4. The adjustable joint as claimed in claim 3, wherein the gripping portion comprises a plurality of independent resilient claws.

5. The adjustable joint as claimed in claim 4, wherein each claw comprises a limiting block integrally formed on a distal end thereof for preventing the fastening ring from disengaging from the gripping portion.

6. The adjustable joint as claimed in claim 4, wherein the thickness of each claw gradually increases from the sleeve portion to a distal end thereof.

7. The adjustable joint as claimed in claim 1, wherein the joint member comprises a receiving portion and a fulcrum portion formed on the receiving portion, the latching member received in the receiving portion.

8. The adjustable joint as claimed in claim 7, wherein the fulcrum portion defines a through hole therein and comprises a top surface defining an opening thereon, the opening communicating with the through hole.

9. The adjustable joint as claimed in claim 7, wherein the joint member further comprises a latching unit rotatably connected to the fulcrum portion.

10. The adjustable joint as claimed in claim 9, wherein the latching unit comprises a latching end and a driven end opposite to the latching end.

11. The adjustable joint as claimed in claim 10, wherein the joint member further comprises a resilient unit driving the driven end of the latching unit.

12. The adjustable joint as claimed in claim 11, wherein the resilient unit comprises two torsion springs positioned side by side, the two torsion springs are rotatably connected to the fulcrum portion through a pivot shaft, and each torsion spring comprises first and second resilient ends with each first resilient end resisting the driven end of the latching unit and each second resilient end resisting the fulcrum portion.

13. The adjustable joint as claimed in claim 7, wherein the resilient portion further comprises a spring received in the receiving portion and positioned between the latching member and the fulcrum portion.

14. The adjustable joint as claimed in claim 1, wherein the connecting member comprises two link lever portions, and each link lever portion comprises a first link lever, a second link lever and a third link lever, the first link lever, the second link lever, and the third link lever rotatably connected to each other in sequence.

* * * * *